(12) United States Patent
Wright et al.

(10) Patent No.: US 11,790,594 B2
(45) Date of Patent: Oct. 17, 2023

(54) RAY-TRACING WITH IRRADIANCE CACHES

(71) Applicant: NVIDIA Corporation, Santa Clara, CA (US)

(72) Inventors: Oliver Mark Wright, Northwich (GB); Jakub Boksansky, Munich (DE)

(73) Assignee: NVIDIA Corporation, Santa Clara, CA (US)

( * ) Notice: Subject to any disclaimer, the term of this patent is extended or adjusted under 35 U.S.C. 154(b) by 425 days.

(21) Appl. No.: 16/996,045

(22) Filed: Aug. 18, 2020

(65) Prior Publication Data
US 2021/0049807 A1 Feb. 18, 2021

Related U.S. Application Data

(60) Provisional application No. 62/888,540, filed on Aug. 18, 2019.

(51) Int. Cl.
*G06T 15/06* (2011.01)
*G06T 15/50* (2011.01)

(52) U.S. Cl.
CPC ............ *G06T 15/06* (2013.01); *G06T 15/506* (2013.01)

(58) Field of Classification Search
CPC .............................. G06T 15/06; G06T 15/506
See application file for complete search history.

(56) References Cited

U.S. PATENT DOCUMENTS

| 7,199,795 | B2* | 4/2007 | Christensen ............ G06T 15/06 |
| | | | 345/428 |
| 8,207,968 | B1* | 6/2012 | Krishnaswamy ....... G06T 15/06 |
| | | | 345/428 |
| 8,223,148 | B1 | 7/2012 | Carr et al. |
| 8,314,797 | B1 | 11/2012 | Krishnaswamy et al. |
| 9,953,457 | B2* | 4/2018 | Keller .................... G06T 15/06 |
| 10,679,407 | B2* | 6/2020 | Schissler ................ G06T 15/06 |
| 10,952,302 | B2* | 3/2021 | Ashdown ............. H05B 47/105 |

(Continued)

FOREIGN PATENT DOCUMENTS

EP 3220356 A1 9/2017

OTHER PUBLICATIONS

Final Office Action dated Dec. 11, 2020 in U.S. Appl. No. 16/523,368, 29 pages.

(Continued)

*Primary Examiner* — Phuc N Doan
(74) *Attorney, Agent, or Firm* — Taylor English Duma L.L.P.

(57) ABSTRACT

Disclosed approaches provide for irradiance caches which may be used to share irradiance between ray interactions spatially and/or temporally. An irradiance cache may store incoming irradiance or outgoing irradiance and may be updated by casting one or more rays from one or more locations to sample irradiance for the location(s). The number of rays that are cast may be reduced by ranking the locations, irradiance caches, and/or corresponding groups of geometry based on one or more characteristics thereof. For example, a ranking score may be computed based on camera distance, camera visibility, and/or a number of frames since a prior update. When sampling a location, outgoing irradiance from an outgoing irradiance cache may be used to determine shading when a hit distance of a ray used to generate the sample exceeds a threshold value.

20 Claims, 11 Drawing Sheets

(56) References Cited

U.S. PATENT DOCUMENTS

| | | | |
|---|---|---|---|
| 2004/0125103 | A1 | 7/2004 | Kaufman et al. |
| 2005/0243082 | A1* | 11/2005 | Christensen ............ G06T 15/06 345/418 |
| 2007/0206008 | A1* | 9/2007 | Kaufman ................ G06T 15/06 345/427 |
| 2008/0122846 | A1 | 5/2008 | Brown et al. |
| 2009/0167763 | A1 | 7/2009 | Waechter et al. |
| 2010/0164948 | A1 | 7/2010 | Kho et al. |
| 2013/0176313 | A1* | 7/2013 | Gautron ................. G06T 15/50 345/426 |
| 2016/0005217 | A1 | 1/2016 | Tokuyoshi |
| 2018/0061111 | A1* | 3/2018 | Engel ..................... G06T 15/08 |
| 2018/0096516 | A1 | 4/2018 | Luebke et al. |
| 2018/0315251 | A1 | 11/2018 | Sun et al. |

OTHER PUBLICATIONS

International Preliminary Report on Patentability received for PCT Application No. PCT/US2019/043673, dated Feb. 4, 2021, 9 pages.
Meissner, M., et al., "Vizard II: A PCI Card for Real-Time Volume Rendering", In Proceedings of the Siggraph/Eurographics Workshop on Graphics Hardware, pp. 1-7 (Aug. 1998).
Non-Final Office Action dated May 14, 2021 in U.S. Appl. No. 16/523,368, 35 pages.
J. Laurijssen et al: "Fast Estimation and Rendering of Indirect Highlights", Computer Graphics Forum, vol. 29, No. 4, Jun. 26, 2010 (Jun. 26, 2010), pp. 1305-1313.
Jacob Munkberg et al: "Texture space caching and reconstruction for ray tracing", ACM Transactions on Graphics, ACM, 2 Penn Plaza, Suite 701, New York, NY10121-0701, USA, vol. 35, No. 6, Nov. 11, 2016 (Nov. 11, 2016), pp. 1-13.
Lafortune E P et al: "Reducing the number of shadow rays in bidirectional path tracing", Winter School of Computer Graphics and Visualisation 95 Third International Conference in Central Europe on Computer Graphics and Visualisation 95. Conference Proceedings Univ. West Bohemia, vol. 2, Jan. 1, 1995 (Jan. 1, 1995), pp. 1-9.
Liktor et al: "Decoupled deferred shading for hardware rasterization", Proceedings of the ACM SIGGRAPH Symposium on Interactive 3D Graphics and Games, Mar. 9, 2012 (Mar. 9, 2012), pp. 143-150.
International Search Report and Written Opinion dated Oct. 14, 2019 in International Patent Application No. PCT/US2019/043673, 12 pages.
Bekaert, Philippe, Mateu Sbert, and John H. Halton. "Accelerating Path Tracing by Re-Using Paths." Rendering Techniques 2 (2002): 125-134.
Preinterview First Office Action dated Sep. 2, 2020 in U.S. Appl. No. 16/523,368, 4 pages.
International Search Report and Written Opinion received for PCT Patent Application No. PCT/US2020/046816, dated Sep. 28, 2020, 9 pages.
First Action Interview Office Action dated Oct. 20, 2020 in U.S. Appl. No. 16/523,368, 4 pages.
Notice of Allowance dated Sep. 29, 2021 in U.S. Appl. No. 16/523,368, 09 pages.
International Preliminary Report on Patentability received for PCT Application No. PCT/US2020/046816, dated Mar. 3, 2022, 8 pages.

* cited by examiner

RAY-TRACING WITH IRRADIANCE CACHES

CROSS-REFERENCE TO RELATED APPLICATIONS

This application claims the benefit of U.S. Provisional Application No. 62/888,540, filed on Aug. 18, 2019, which is hereby incorporated by reference in its entirety.

BACKGROUND

Ray-tracing may be used to render images by tracing paths of light in a virtual environment and simulating the effects of the light's encounters with virtual objects. Various applications of ray-tracing technology may include simulating a variety of optical effects—such as shadows, reflections and refractions, scattering phenomenon, and dispersion phenomenon (such as chromatic aberration). In some applications of ray-tracing, lighting conditions such as global illumination may be simulated by taking into account not only light that comes directly from a light source (direct illumination), but also light that is reflected off of surfaces (indirect illumination). Calculating the incoming radiance for ray reflections—also called shading secondary rays (e.g., rays other than initial, eye, or primary rays of a light transport path)—often accounts for a significant amount of the computation when ray-tracing, as there are potentially many more secondary rays than primary rays.

For example, in a given light transport path there may be a single primary ray and any number of bounces that spawn secondary rays. Additionally, at each bounce a large amount of secondary rays may be needed to sample irradiance for a location in order to accurately reflect lighting conditions. For example, at a surface (e.g., a diffuse or glossy surface) lighting that is sampled by a secondary ray may only account for one direction (of many possible directions) in which light particles may scatter from the surface. Due to the potentially large number of samples, the computational resources required to render such a scene may impose too great of a delay for real-time rendering applications, such as gaming.

SUMMARY

Embodiments of the present disclosure provide for ray-tracing with irradiance caches. In various respects, the present disclosure provides improved approaches for determining lighting contributions of interactions of light transport paths that may be used for determining or rendering global illumination or other applications of ray-tracing techniques.

The present disclosure describes a technique for using irradiance caches that may be used to share irradiance between ray interactions spatially and/or temporally. For example, an irradiance cache may correspond to a location in the virtual environment and may be used to aggregate irradiance samples (e.g., radiance of rays used to determine irradiance at the location), thereby increasing the effective sample count used to compute lighting conditions. An irradiance cache may store incoming irradiance or outgoing irradiance, and may be updated by casting one or more rays from one or more locations to sample irradiance for the location(s). In at least one embodiment, the number of rays that are cast may be adapted based at least on ranking the locations, irradiance caches, and/or corresponding groups of geometry based at least on one or more characteristics thereof. For example, a ranking score may be computed based on factors such as camera distance, camera visibility, and/or a number of frames since a prior update. In further respects, when sampling a location, outgoing irradiance from an outgoing irradiance cache may be used to determine shading associated with the location when a hit distance of a ray used to generate the sample exceeds a threshold value. Using outgoing irradiance as such may be more computationally efficient than incoming irradiance.

BRIEF DESCRIPTION OF THE DRAWINGS

The present systems and methods for ray-tracing with irradiance caches is described in detail below with reference to the attached drawing figures, wherein.

DETAILED DESCRIPTION

Figure 1:
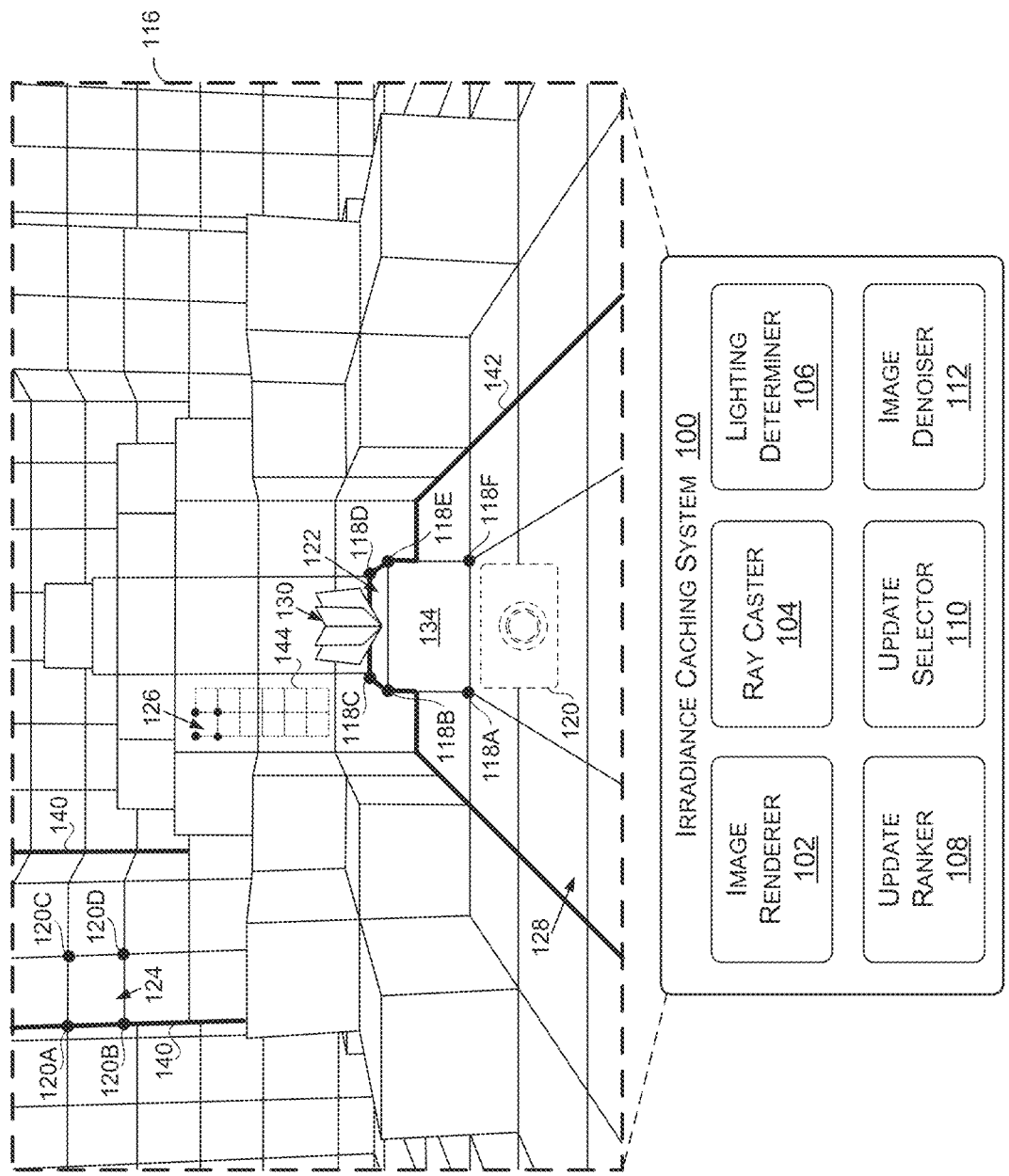
FIG. 1 is an example system diagram of an irradiance caching system, in accordance with some embodiments of the present disclosure.

Embodiments of the present disclosure provide for ray-tracing with irradiance caches. In various respects, the present disclosure provides improved approaches for determining lighting contributions of interactions of light transport paths that may be used for computing or rendering global illumination or other ray-tracing applications.

The present disclosure provides for techniques for sharing irradiance between ray interactions spatially and/or temporally. For example, an irradiance cache may correspond to a location in the virtual environment and may be used to aggregate irradiance samples, thereby increasing the effective sample count used to compute lighting conditions. According to one or more embodiments, an irradiance sample may comprise radiance of a single ray cast from a location and may be one of many samples used to calculate irradiance. An irradiance cache may store incoming irradiance or outgoing irradiance and may be updated by casting one or more rays from one or more locations to sample irradiance for the location(s). Data of an irradiance cache may be stored in or mapped to geometry of the virtual environment, such as at or in association with the location(s). For example, irradiance (e.g., incoming irradiance and/or outgoing irradiance) may be stored in vertices of objects in the virtual environment and/or a light map texture. In various examples, irradiance for a location may be determined from irradiance in one or more irradiance caches of one or more other locations using interpolation, blending, or other techniques. For example, irradiance for a location on a face of an object may be computed from irradiance from irradiance caches at one or more vertices of the face, reducing the number of irradiance caches needed and/or locations that need to be sampled to update the irradiance caches.

In further respects, the number of rays that are cast to update irradiance caches may be reduced by selecting a subset of locations and/irradiance caches in a virtual environment based at least on one or more associated characteristics. Examples of characteristics include camera distance, camera visibility, and/or a number of frames since a prior update. In some embodiments, geometry of the virtual environment may be divided into geometry groups, where each geometry group may comprise a different subset of irradiance caches. A geometry group may be selected based at least on one or more associated characteristics of the geometry group and one or more irradiance caches within the group may be updated. This may allow for efficiently selecting irradiance caches without analyzing each irradiance cache and/or associated location in the virtual environment.

In various embodiment, the selecting may be based at least on ranking the locations, irradiance caches, and/or corresponding groups of geometry based at least on the one or more characteristics thereof. For example, a ranking score may be computed based on the one or more characteristics. A budget may be used to select locations and/or irradiance caches for updating to, for example, limit computational overhead and maintain consistency in the computational overhead across frames. The budget may define a number of rays that are cast to perform the updating and act as a hard or soft constraint on the number of rays that are cast. Geometry groups, locations, and/or irradiance caches may be selected from based on ranking scores until the budget is exceeded.

In further respects, when sampling a location, outgoing irradiance from an outgoing irradiance cache may be used to determine shading associated with the location when a hit distance of a ray used to generate the sample exceeds a threshold value. When the hit distance of the ray does not exceed the threshold value, incoming irradiance from an incoming irradiance cache may be used to compute outgoing irradiance for shading. Using outgoing irradiance may be less accurate than incoming irradiance, but more computationally efficient. When the hit distance exceeds the threshold value, the use of outgoing irradiance may be largely imperceptible in a rendered frame.

With reference to FIG. 1, FIG. 1 is an example system diagram of an irradiance caching system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. In some embodiments, features, functionality, and/or components of the irradiance caching system 100 may be similar to those of example game streaming system 900 of FIG. 9 and/or example computing device 1000 of FIG. 10. For example, in some embodiments and with respect to FIG. 9, the irradiance caching system 100 may correspond to a streaming application, and the methods described herein may be executed by a compute server(s) 902 to generate rendered frames which may be streamed to the client device(s) 904. In one or more embodiments, the irradiance caching system 100 may correspond to simulation applications, and the methods described herein may be executed by one or more servers to render graphical output for simulation applications, such as those used for testing and validating autonomous navigation machines or applications, or for content generation applications including animation and computer-aided design. The graphical output produced may be streamed or otherwise transmitted to one or more client device, including, for example and without limitation, client devices used in simulation applications such as: one or more software components in the loop, one or more hardware components in the loop (HIL), one or more platform components in the loop (PIL), one or more systems in the loop (SIL), or any combinations thereof.

Figure 5:
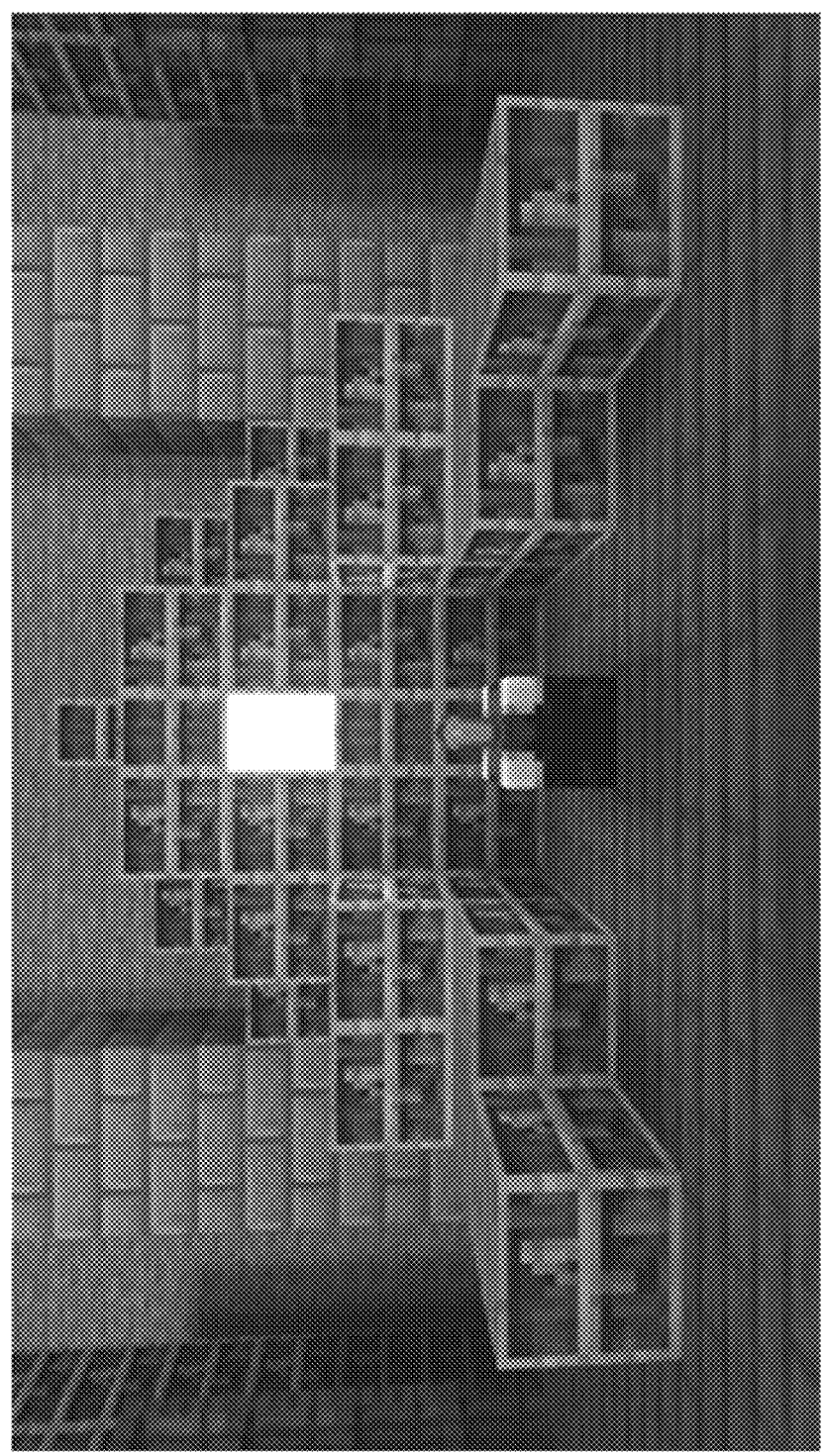
FIG. 5 shows an example of a rendered frame of a virtual environment, in accordance with at least some embodiments of the present disclosure.
Figure 9:
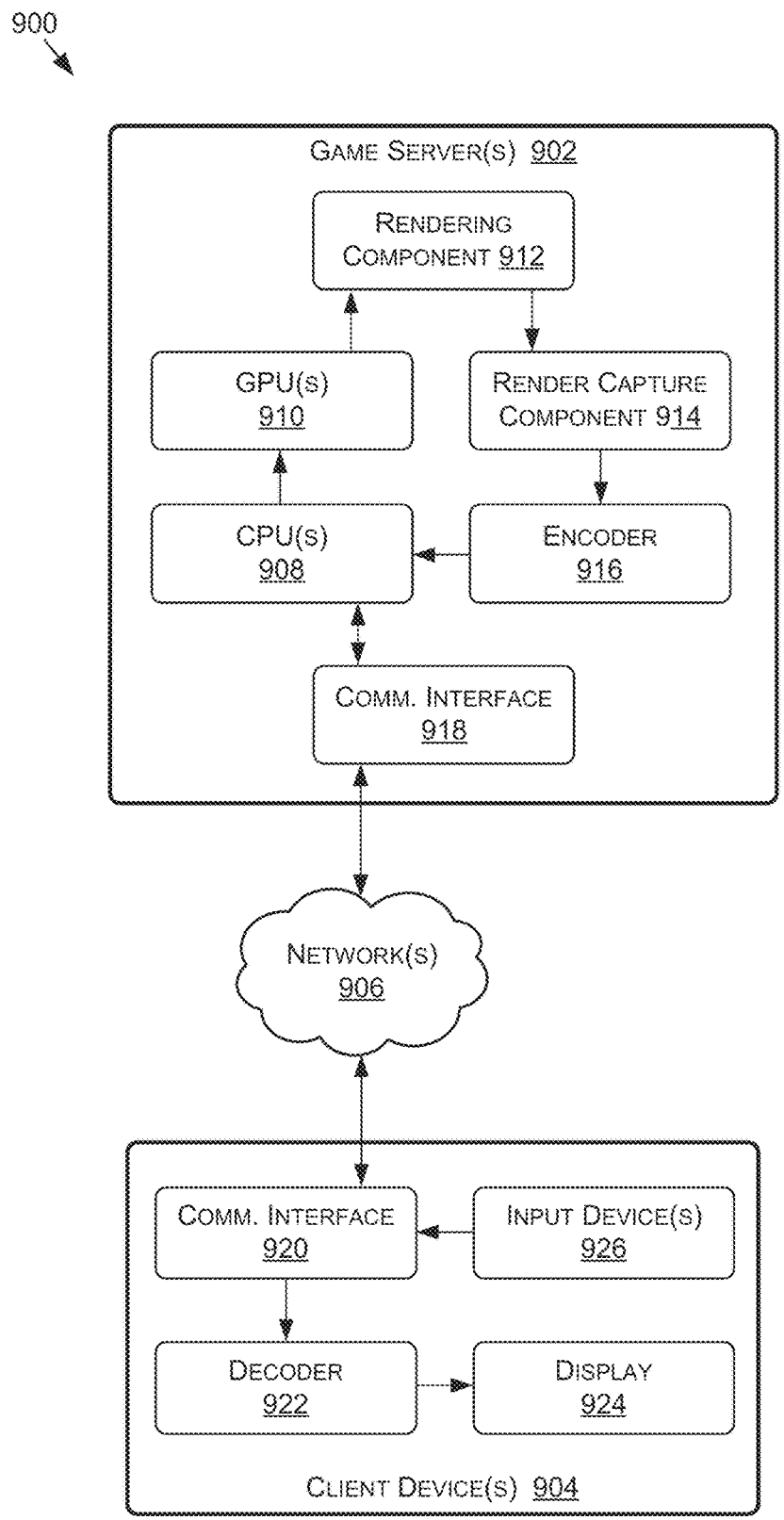
FIG. 9 is a block diagram of an example game streaming system suitable for use in implementing some embodiments of the present disclosure.

The irradiance caching system 100 may include, among other things, an image renderer 102, a ray caster 104, a lighting determiner 106, an update ranker 108, an update selector 110, and an image denoiser 112. The image renderer 102 may be configured to render images (e.g., frames) of virtual environments, such as the virtual environment 116. To render an image of a virtual environment, the image renderer 102 may employ the ray caster 104, the lighting determiner 106, the update ranker 108, the update selector 110, and the image denoiser 112. For example, the image renderer 102 may use those components to implement any of a variety of ray-tracing techniques and rendering techniques. In various embodiments, the image renderer 102 may render frames of the virtual environment 116, such as a frame 500 of FIG. 5, using any suitable approach that uses rays to sample lighting conditions of a virtual environment (e.g., to generate solutions to the rendering equation for pixels).

Where the irradiance caching system 100 is included in a cloud streaming environment—such as the example game streaming system 900 of FIG. 9—the rendered frame may be encoded and streamed to an end-user device (e.g., the client device 904). In other embodiments, the irradiance caching system 100 may be executed by a local system, such as a laptop, desktop, tablet, gaming console, smart phone, and/or the like. In such examples, the rendering may be executed locally, or the rendering may be executed remotely, and the irradiance caching system 100 may be used to generate the rendered frame locally.

As an overview, to render frames of a virtual environment, the ray caster 104 may be configured to trace rays in a virtual environment to define one or more portions of ray-traced light transport paths (e.g., between a viewpoint camera and one or more light sources) within the virtual environment over one or more frames. The lighting determiner 106 may be configured to determine—based at least in part on the traced rays—data representative of lighting contributions (also referred to as lighting contribution data) of interactions of the ray-traced light transport paths in the virtual environment (e.g., with surfaces), such as irradiance (e.g., diffuse irradiance). The lighting determiner 106 may further aggregate the data representative of the lighting contributions (e.g., incident radiance or irradiance values) to update one or more irradiance caches. The lighting determiner 106 may also use the data from one or more irradiance caches to compute data representative of lighting conditions (also referred to as lighting condition data) for rendered images (e.g., for pixels). The lighting determiner 106 may determine irradiance for and/or update one or more of the irradiance caches (e.g., periodically) using the update ranker 108 and the update selector 110. The update ranker 108 may be configured to rank (e.g., using a ranking score) irradiance caches and/or locations in a virtual environment based at least on one or more characteristics thereof. The update selector 110 may be configured to select one or more of the irradiance caches and/or locations based at least on the ranking. The lighting determiner 106 may then determine irradiance for the selected irradiance caches and/or locations. The image denoiser 112 may be configured to denoise render data, such as lighting contribution data and/or lighting condition data.

FIG. 1 shows the virtual environment 116 including a camera 120 and 3D geometry. In the example shown, the 3D geometry includes 3D objects (e.g., instantiations of 3D models), such as an object 122, an object 124, an object 126, an object 128, and an object 130. In embodiments, each 3D object may comprise geometry data which defines the shape of the object in 3D space. By way of example and not limitation, the geometry data may represent a polygon mesh which may comprise a collection of vertices, edges, and/or faces. In the example shown, the object 122 includes eight vertices (which may be referred to herein to as vertices 118) of which vertices 118A, 118B, 118C, 118D, 118E, and 118F are individually shown and labeled. The vertices 118 define faces of the object 122, such as a face 134. While only the face 134 is labeled, the vertices 118 may define the object 122 as a cube having six faces with the vertices 118 joining the corners. The object 122 may further comprise one or more textures and/or texture portions mapped to one or more portions (e.g., faces) of the object 122 (e.g., a diffuse map, albedo map, light map, etc.).

The other 3D objects in the virtual environment 116 may be similar to or different than the object 122. For example, the object 124, 126, and 128 and generally any similar rectangular region shown in the virtual environment 116 may correspond to a face of a 3D cube, or block, but may have different texture mappings (e.g., similar to Minecraft). However, this is not intended to be limiting. Generally, the geometry data of the 3D objects may define the shape of the 3D objects using any suitable format and the shapes may take a variety of possible forms. As an example, in some embodiments, at least some of the geometry data may represent one or more voxels and/or splines, such as Non-Uniform Rational B-Splines (NURBS).

In various embodiments, locations in the virtual environment 116 (e.g., of 3D objects) may be associated with one or more of the irradiance caches to store irradiance in association with one or more of the locations. The irradiance may correspond to one or more ray-traced irradiance samples, for example, as described herein with respect to FIG. 2. The irradiance (e.g., diffuse irradiance) may comprise incoming irradiance associated with a location(s) and/or outgoing irradiance associated with the location(s). In embodiments where an irradiance cache comprises outgoing irradiance, the outgoing irradiance associated with (e.g., outgoing or incoming from/to or near the locations) the location(s) may be computed from incoming irradiance associated with the location(s) (e.g., from the irradiance cache and/or ray-traced samples of irradiance). For example, the outgoing irradiance may be computed based at least on the incoming irradiance from the irradiance cache, material properties (e.g., diffuse albedo), and any lighting that may not be captured by the irradiance cache, such as sun lighting (e.g., determined using shadow rays) and any self-illumination which may include a self-emissive component to the material and/or location(s). In some embodiments, the outgoing irradiance includes all lighting contributions associated with the location(s) that are used to render the virtual environment 116. In various embodiments the outgoing irradiance comprises a result of shading the one or more locations, such as a lighting color that may be combined with a texture map(s) to determine a final color(s) of the location(s).

Data of an irradiance cache may be stored in or mapped to geometry of the virtual environment 116, such as at or in association with the location(s). For example, in FIG. 1, irradiance (e.g., incoming irradiance and/or outgoing irradiance) may be stored in each of the vertices of the virtual environment 116. The irradiance stored at a location(s) (e.g., a vertex) may correspond to irradiance sampled from or otherwise in association with the location. For example, each vertex may store irradiance sampled from a location of the vertex in the virtual environment 116. In some examples, irradiance caches and/or updates thereto may be limited to static objects in the virtual environment 116. In some embodiments slowly moving dynamic objects may also have irradiance caches and/or updates thereto. In some cases, faster moving dynamic objects may require additional samples per-irradiance cache update. In at least one embodiment, the irradiance may comprise an irradiance value, such as a color value, and a normal that defines a plane from which the irradiance is sampled (e.g., a sampled hemisphere). In at least one embodiment, the irradiance for a location(s) of geometry may be stored in a vertex buffer for the geometry. The vertex buffer may in some examples sit alongside a conventional vertex buffer to provide an additional channel(s) for storing vertex information.

In addition to or instead of vertices, irradiance associated with a location(s) may be stored in a texture of a texture map associated with (e.g., mapped to) the location(s). For example, the irradiance for a location(s) may be stored in a light map texture, such as at the location(s) in the light map texture (e.g., in the portion of the light map texture that is mapped to the location). Storing irradiance in a light map texture may be preferred in some cases where the geometry of the virtual environment 116 and/or an object therein is highly detailed and computing irradiance from the irradiance cache may be computationally prohibitive.

Figure 2:
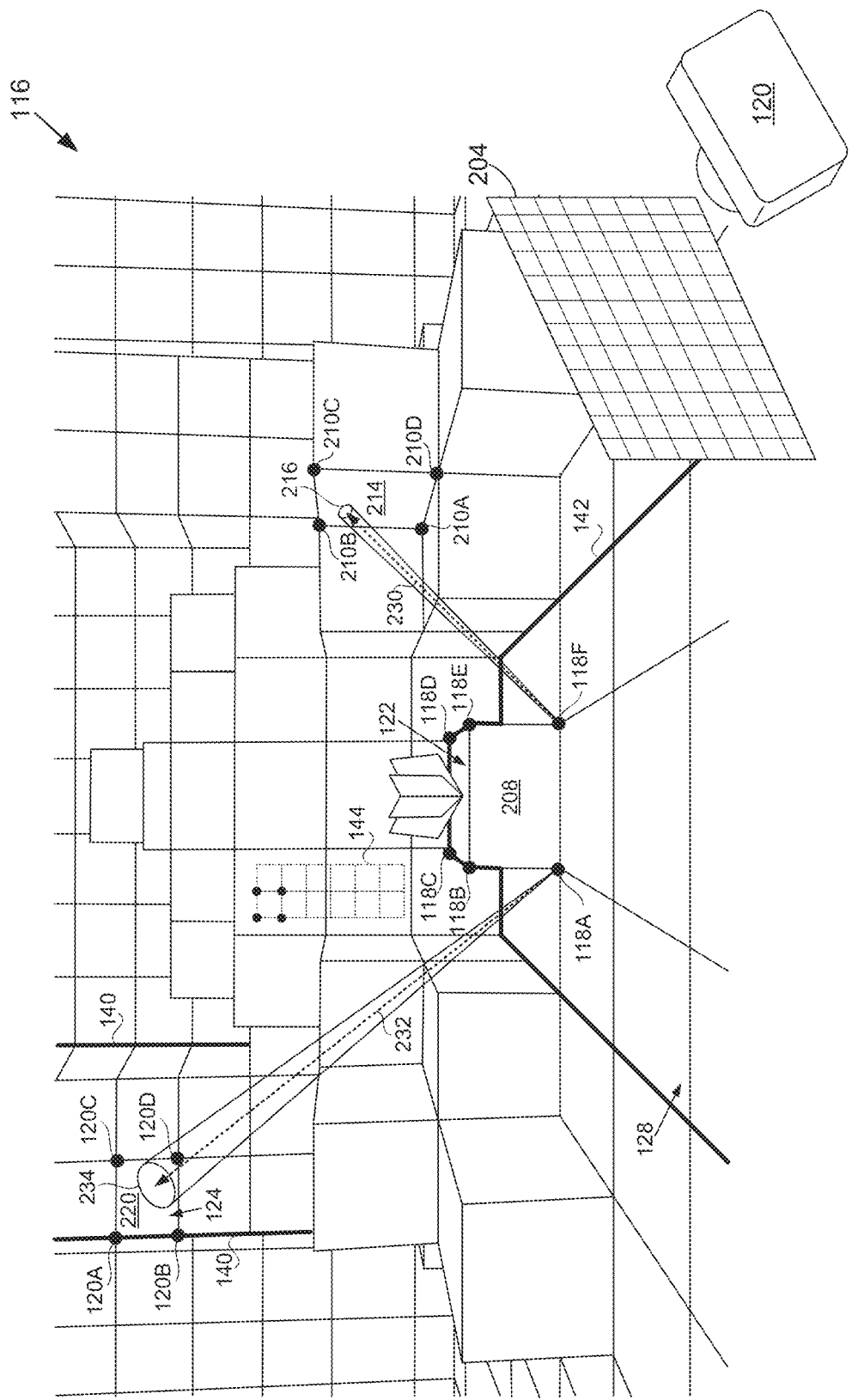
FIG. 2 shows as example of determining irradiance for irradiance caches, in accordance with at least some embodiments of the present disclosure.

In various embodiments, the irradiance for a location(s) in the virtual environment 116 may be computed from irradiance caches stored for one or more other locations. An example will be described with respect to FIG. 2. Referring now to FIG. 2, FIG. 2 shows as example of determining irradiance for irradiance caches, in accordance with at least some embodiments of the present disclosure. FIG. 2 shows vertices 210A, 210B, 210C, and 210D (also referred to herein as vertices 210). The vertices 210 may be similar to the vertices 118, but may correspond to a different 3D object and define a face 214. For example, each vertex of the vertices 210 may store incoming irradiance of the vertex. In accordance with at least one embodiment, irradiance of a location 216 (e.g., a point or area) may be computed from irradiance sampled at one or more of the vertices 210. In at least one embodiment, a contribution of irradiance from one location (e.g., a vertex) to the location 216 may be based at least in part on a distance or proximity between the locations. In embodiments where irradiance of multiple locations (e.g., each of vertices 210) are used to derive irradiance for the location 216, the lighting determiner 106 may interpolate irradiance values between the locations to compute the irradiance at the location 216. For example, barycentric interpolation may be applied to irradiance values of the vertices 210 to compute an irradiance value(s) any given point and/or area bounded by the vertices 210 (e.g., on the face 214). Where a light map or other texture is used to store the irradiance, the interpolated values may be stored in the texture and may be looked up and/or updated as needed. In further examples, irradiance of the vertices 210 may be used to compute irradiance at other locations as needed. Where a texture is employed to store the irradiance, irradiance may or may not be stored at the vertices 210 and irradiance may not be sampled from the vertices 210 to determine and/or update irradiance for other locations.

Figure 3:
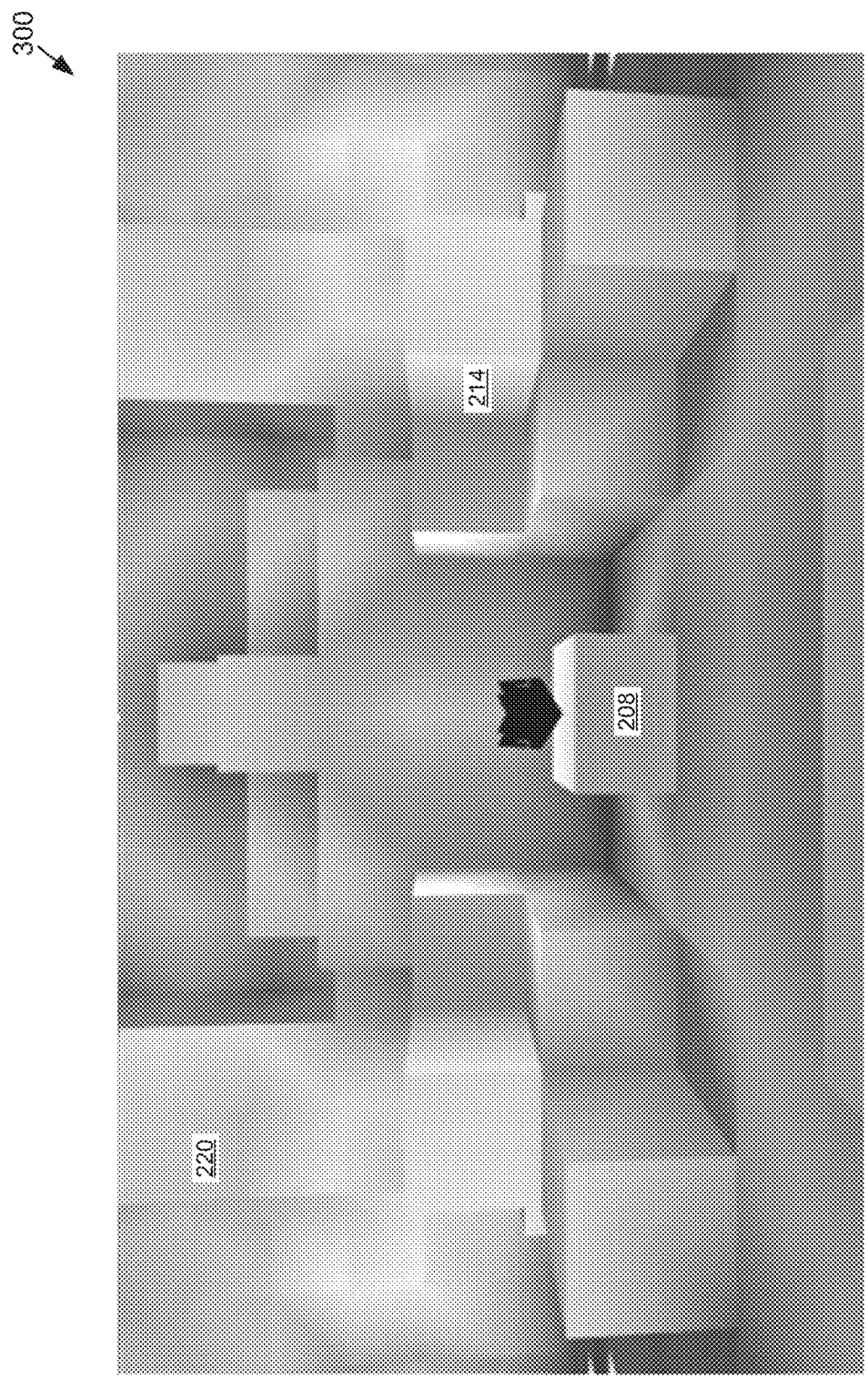
FIG. 3 shows an example of a visualization of incoming irradiance in a virtual environment, in accordance with at least some embodiments of the present disclosure.

Referring now to FIG. 3, FIG. 3 shows an example of a visualization 300 of incoming irradiance in the virtual environment 116, in accordance with at least some embodiments of the present disclosure. The visualization 300 may depict stored (e.g., in one or more texture maps) and/or computed irradiance (e.g., using interpolation) for the geometry of the virtual environment 116 shown in FIG. 1. As an example, the visualization 300 may depict incoming irradiance for a frame 500 of FIG. 5 which may be rendered by the image renderer 102.

Figure 4:
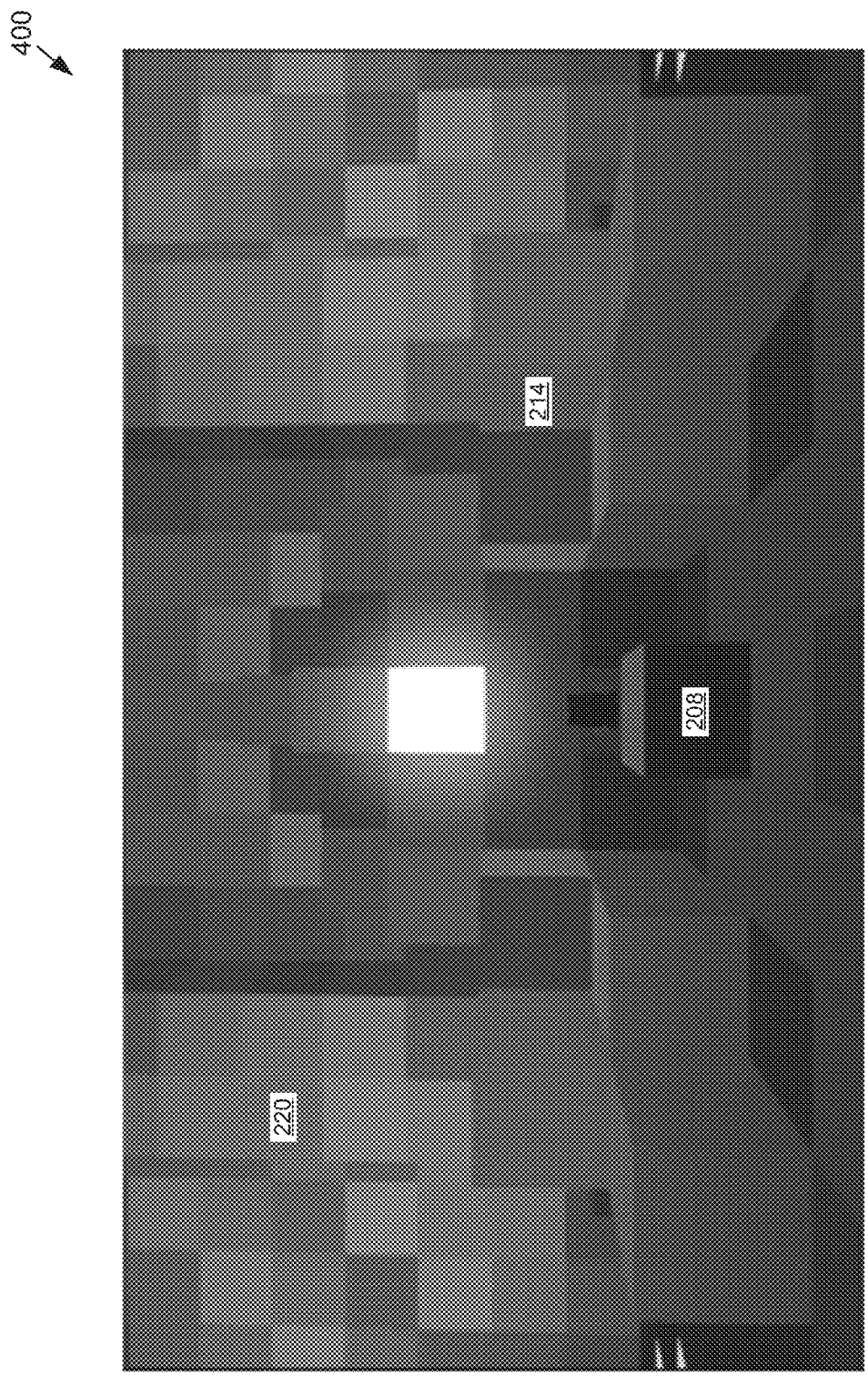
FIG. 4 shows an example of a visualization of outgoing irradiance in a virtual environment, in accordance with at least some embodiments of the present disclosure.

As further examples, in at least one embodiment the irradiance (e.g., outgoing irradiance) may be stored at the primitive (e.g., polygon, quad, or triangle) level. For example, outgoing irradiance for a location(s) may be stored in a face of a 3D object at the location(s). Thus, the face 134 of the object 122 may be used to store outgoing irradiance for locations on or near the face 134 (e.g., as a single color value per-face). Referring now to FIG. 4, FIG. 4 shows an example of a visualization 400 of outgoing irradiance in the virtual environment 116, in accordance with at least some embodiments of the present disclosure. The visualization 400 may depict stored (e.g., using a primitive) and/or computed irradiance for the geometry of the virtual environment 116 shown in FIG. 1. As an example, the visualization 400 may depict outgoing irradiance for a frame that may be rendered by the image renderer 102. While in the example shown, the outgoing irradiance comprises a single color per-face, in other examples the outgoing irradiance may be stored and/or computed with higher detail (e.g., with multiple colors per-face). Higher detail may be desirable, for example, where there is a lot of geometry detail. Light maps may be used to decouple the outgoing irradiance samples from the geometry detail. In other areas, a large number of light map texels could be used in a single face.

Focusing again on FIG. 2, the lighting determiner 106 may determine irradiance for an irradiance cache (e.g., in a vertex, in a light map, etc.) based at least on sampling irradiance of one or more associated locations. The results of the sampling may then be combined with current irradiance stored in the irradiance cache (if any) to update the irradiance in the irradiance cache. In at least one embodiment, a sample(s) captured in each irradiance cache may comprise spatial samples and/or temporal samples relative to a current frame or state. A spatial irradiance sample may refer to irradiance that corresponds to a time and/or state of the virtual environment being sampled to determine irradiance for that time and/or state. A temporal irradiance sample may refer to irradiance that corresponds to a different (e.g., previous) time or state of the virtual environment from the time and/or state for which irradiance is being sampled and/or determined. For example, each state may be associated with a respective time and a respective rendering configuration of the virtual environment. The time may refer to a time in the render sequence and/or a playback sequence of a game, video, and/or rendered frames. The rendering configuration may refer to a set of render properties of objects (e.g., all visible objects) in the virtual environment that impact spatial rendering of the virtual environment. For example, two states may have the same rendering configuration when the render properties are the same for each state.

In at least one embodiment, the lighting determiner 106 may combine the samples to determine irradiance for an irradiance cache. For example, the samples may be averaged and an average value(s) may be stored as the irradiance in the irradiance cache. In other examples, multiple samples may be stored in an irradiance cache and the samples may be averaged or otherwise combined to compute the irradiance from values stored in the irradiance cache. In either case, a weighted average may be used to combine the samples. Spatial samples may be weighted higher than temporal samples and weighting may decrease with increasing time (e.g., weighted based on the frame for which the irradiance was sampled). For example, in order to limit the temporal extent, the lighting determiner 106 may average the new irradiance sample(s) with the previous sample(s), each frame using a modified exponential average method or other algorithm (e.g., a moving average algorithm).

The ray caster 104 may use various possible approaches to sample irradiance used to determine irradiance for an irradiance cache. While examples are shown where irradiance is sampled from one or more vertices to determine irradiance for one or more irradiance caches, in other examples, irradiance may be sampled from other locations in the virtual environment which may or may not include an irradiance cache. For example, irradiance could be sampled from one or more locations (e.g., random locations) on the face 214 to determine irradiance for the locations and/or other locations on or near the face 214. Sampling irradiance from a location, such as the vertex 118F, may include sampling a ray from a sampling space. In some cases, the sampling space of a location may comprise a hemisphere on a plane defined by a normal of the location. The ray caster 104 may sample the hemisphere (e.g., stochastically using the sampling space or using another sampling strategy) to determine a ray 230. The direction of the ray 230 may or may not be independent from any incoming primary, secondary, or other incident ray to the vertex 118F (e.g., to sample diffuse irradiance). For example, in some embodiments no incident ray is cast or needed to trigger the sampling from the vertex 118F and if primary rays are cast to render frames, the sampling and updating of the irradiance cache may be decoupled from the casting of the primary rays.

However, in further examples, the ray caster 104 may define a Normal Distribution Function (NDF) range for the vertex 118F (or other location being sampled) based at least in part on the normal of the surface at the location. The ray caster 104 may use the NDF and an incoming ray (such as a primary ray, secondary ray, or other incident ray and in some examples a roughness value of the surface that is associated with the location) to define a Bidirectional Reflectance Distribution Function (BRDF). The ray caster

104 may sample a BRDF lobe (e.g., stochastically using the BRDF or using another sampling strategy) to determine the ray 230.

While the sampling and updating of an irradiance cache may be decoupled from incident rays, in other cases a primary ray may trigger the sampling. For example, irradiance caches may be integrated into path tracing computations of diffuse or directional lighting. In one or more embodiments, an incident ray may also (or instead) trigger sampling and updating of an irradiance cache where multiple bounces of a ray cast from a location are used to determine irradiance at the irradiance cache (e.g., initially triggered by a first ray cast from the location or initially triggered by a primary ray). However, in some embodiments, a single ray per sample may be cast from a location to determine irradiance for an irradiance cache without directly accounting for bounces. For example, the ray 230 may be the only ray cast to sample irradiance of the vertex 118F. In embodiments, a single sample may be determined for each location, multiple samples may be determined, or a variable number of samples per-location may be used.

In at least one embodiment, the ray caster 104 may determine an interaction of the ray 230 with a surface, such as a surface corresponding to the face 214, as shown. The ray caster 104 may also determine the location 216 that corresponds to the interaction. In some embodiments the location 216 may be a point. In the example shown, the location 216 is an area, and more particularly a cross-section of a ray cone. The ray caster 104 may determine the ray cone using a cone angle. The ray caster 104 may determine and/or assign the cone angle based at least on the roughness of the surface that the ray 230 is launched from. A smooth surface may result in a narrow cone which may widen with surface roughness. In some cases, a fixed cone angle may be used to define each ray cone cast in the virtual environment 116 without evaluating surface roughness.

The irradiance sample for an irradiance cache determined using the ray 230 may comprise radiance determined based at least on irradiance from one or more irradiance caches associated with the location 216. In embodiments where a ray cone is used, the lighting determiner 106 may compute the radiance based at least on an average of the radiance for the directions covered by the ray cone or the radiance of only the ray 230 may be considered. When multiple direction are considered, this computation may include looking up and/or computing the cached irradiance values over the location 216 (e.g., within the cross-section). As described herein, the irradiance values may be stored in a light map within the cross-section and/or may be computed from cached irradiance values of other locations, such as the vertices 210 (e.g., using interpolation). In other examples a single cached irradiance value may be used as an irradiance sample for the ray 230 or a different technique may be used to determine the locations used to derive the irradiance sample.

The lighting determiner 106 may combine the irradiance sample (e.g., the radiance of the ray 230) with the irradiance in the irradiance cache(s) and store the result in the irradiance cache(s). For example, the irradiance of the irradiance cache at the vertex 118F may be combined with the irradiance sample. In embodiments where the vertex 118F is used to update one or more irradiance caches at other locations, interpolation or other techniques may be used to derive a corresponding irradiance sample from the irradiance sample, or the irradiance sample may be used. While only the ray 230 is cast from the vertex 118F, in other example multiple irradiance sampled may be determined using multiple rays.

Each irradiance cache that is updated may be updated using a similar approach. Updating an irradiance cache using irradiance from one or more other irradiance caches may allow for the irradiance to be accurately determined while reducing the number of bounces used in determining the ray-traced samples. For example, introducing a loop into the updating algorithm (e.g., updating irradiance caches over frames) may effectively introduce additional bounces (reflections) into the computation at no additional cost. When the irradiance cache itself is used to update its contents, the light from multiple bounces is accumulated. This may make the requirement of tracing rays for more than one secondary bounce of light unnecessary, assuming the temporal accumulation caused by this loop and low frequency storage on surfaces are sufficient to ensure acceptable quality.

In addition to or instead of updating an irradiance cache, the irradiance samples of locations may be used by the image renderer 102 to implement any of a variety of ray-tracing effects used to render a frame (e.g., alone or in combination with the irradiance from the irradiance caches associated with the locations). For example, the irradiance samples and/or irradiance from the irradiance caches may be used to shade corresponding locations in the virtual environment 116. In at least one embodiment, the lighting determiner 106 may compute the shading (e.g., a shading value) for a location from the irradiance. For example, the shading value may be the outgoing irradiance from the location and may be computed from the irradiance samples and/or irradiance cache, material properties (e.g., diffuse albedo), and any lighting that may not be captured by the irradiance, such as sun lighting (e.g., determined using shadow rays) and any self-illumination which may include a self-emissive component to the material and/or location(s). In embodiments where an outgoing irradiance cache is used, the lighting determiner 106 may update the outgoing irradiance cache using the computed outgoing irradiance (e.g., each time the incoming irradiance cache is updated or at a different frequency). The outgoing irradiance cache may be updated similarly to the incoming irradiance cache (e.g., using a weighted average).

In at least one embodiment, the ray caster 104 may cast any number of eye rays through each pixel of the screen 204. Pixel values of the pixels may be determined using at least the outgoing irradiance in the outgoing irradiance caches associated with the locations that the primary rays interact with. For example, where an outgoing irradiance cache is stored in a face of an object and a primary ray interacts with the face, outgoing irradiance that corresponds to the outgoing irradiance cache may be used to at least partially color the pixel. In some examples, this approach may be used to at least partially color a pixel(s) during or based on a disocclusion of the pixel(s). However, outgoing irradiance caches may not capture outgoing irradiance for a particular frame or pixel with enough detail or accuracy for some applications. Thus, in addition to or instead of the outgoing irradiance caches, the incoming irradiance caches may similarly be used to compute outgoing irradiance values to at least partially color the pixels. Similar to other examples described herein, interpolation may be used when multiple irradiance caches are used to determine the outgoing irradiance. The same outgoing irradiance may be used for an entire face of an object or interpolation or other techniques may be used.

In various examples, outgoing irradiance caches may be used in addition to or instead incoming irradiance caches when sampling irradiance at locations in the virtual environment 116. For example, outgoing irradiance may be sampled and updated using incoming irradiance caches, or outgoing irradiance may be sampled using outgoing irradiance caches associated with ray interactions.

In at least one embodiment, when sampling irradiance for a location (e.g., the vertex 118F), the lighting determiner 106 may select between using incoming irradiance (e.g., from one or more irradiance caches as described herein) associated with the interaction of a ray, or using outgoing irradiance (e.g., from one or more irradiance caches as described herein) associated with the interaction. The selection may be for whether the lighting determiner 106 uses incoming irradiance or outgoing irradiance to update an outgoing irradiance cache and/or to determine outgoing irradiance for a location(s) (e.g., for shading in a frame).

In some examples, the lighting determiner 106 may make this determination based at least on a distance between the location and the interaction. In at least one embodiment, the lighting determiner 106 may use the incoming irradiance based at least on the distance being less than a threshold value. The lighting determiner 106 may instead use the outgoing irradiance based at least on the distance exceeding a threshold value (e.g., the same threshold value). In addition to or instead of distance—where ray-cones are used to sample locations—the threshold value may be based at least on the width of the cross-section of the ray-cone at the interaction. For example, the width may be a function of the distance. If the same cone angle is used for each ray cone the distance may be the controlling factor in the width of the cross-section and distance could be used as a proxy.

Using outgoing irradiance samples to update an outgoing irradiance cache and/or to determine outgoing irradiance of a location(s) (e.g., for shading in a frame) may be less accurate than incoming irradiance. However, using the outgoing irradiance may consume fewer computing resources than using incoming irradiance. For example, to determine outgoing irradiance for the vertex 118A (e.g., to update an outgoing irradiance cache and/or for shading at least a portion of the object 122), a ray 232 of FIG. 2 may be cast from the vertex 118A (e.g., similar to or different than the ray 230 being cast from the vertex 118F). Based at least on a width of the cross-section 234 (or a distance of the ray 232) being greater than a threshold value, the lighting determiner 106 may use the outgoing irradiance associated with an interaction with a face 220 if the object 124 to update the outgoing irradiance of the vertex 118A (e.g., one or more associated outgoing irradiance caches) and/or determine outgoing irradiance for the vertex 118A and/or one or more associated locations.

This may include the lighting determiner 106 looking up the outgoing irradiance in an outgoing irradiance cache and applying the outgoing irradiance to the vertex 118A. For example, the outgoing irradiance caches may be indexed by primitive IDs and one or more primitive IDs may be returned by an intersection test of the ray 232. The lighting determiner 106 may then use the primitive ID(s) to lookup a corresponding outgoing irradiance cache(s) and access the outgoing irradiance therein. By selecting the outgoing irradiance, the lighting determiner 106 may avoid additional processing and computations associated with determining outgoing irradiance from incoming irradiance, such as determining and applying material properties (e.g., diffuse albedo), and any lighting that may not be captured by the irradiance cache, such as sun lighting (e.g., determined using shadow rays which now may not need to be casted) and any self-illumination that may include a self-emissive component to the material and/or location(s).

The virtual environment 116 may include any number of irradiance caches. In some embodiments, each irradiance cache may be updated for each update pass and/or frame. However, updating each irradiance cache may be computationally expensive, particularly where many irradiance caches are used and/or where the irradiance caches are sampled from many locations in the virtual environment 116. For example, irradiance caches may be spawned with objects in the virtual environment 116 and/or based on world position with respect to a player, the camera 120, and/or visibility of objects and/or locations that correspond to the irradiance caches. In some embodiments there may be millions of visible objects and at least visible faces of the objects may correspond to one or more irradiance caches (e.g., four vertexes per-face with one incoming irradiance cache per-vertex and one outgoing irradiance cache per-face). Casting rays to sample irradiance from millions of locations (as well as to determine outgoing irradiance from the samples) may be computationally prohibitive. Aspects of the present disclosure may limit the number of locations that are sampled to update irradiance caches while retaining the accuracy of lighting determinations.

In accordance with various embodiments, the lighting determiner 106 may use the update selector 110 to select a subset of the irradiance caches of the virtual environment 116 to update and/or select a subset of locations in the virtual environment 116 to sample from to update the irradiance caches. This may limit the number of locations that are sampled to update irradiance caches, thereby preserving computational resources.

The selection may be based on one or more characteristics of one or more locations and/or irradiance caches, such as a distance between the locations and/or irradiance caches and the camera 120, a number of frames since a prior update to the one or more irradiance caches and/or since a prior sampling from the one or more locations, and/or a visibility of the one or more locations and/or irradiance caches with respect to the camera 120.

In at least one embodiment, geometry of the virtual environment 116 may be divided into groups or regions (e.g., 3D sections). For example, FIGS. 1 and 2 show geometry groups 140, 142, and 144. Each geometry group may comprise a different subset of the locations and/or irradiance caches that the update selector 110 selects from for updates to irradiance. The update selector 110 may select one or more of the groups for updates to irradiance. The lighting determiner 106 may then update irradiance for each location and/or irradiance cache within the selected geometry group (or may perform further analysis and/or selection within the group).

Each geometry group may comprise one or more objects of the virtual environment 116. In FIGS. 1 and 2, objects enclosed within a border of a geometry group indicate that those objects belong to the geometry group. For example, the geometry group 142 includes twelve of the objects shown including the object 122 and the object 128. However, the geometry groups shown may include additional objects which are obscured by other geometry in FIGS. 1 and 2. In some embodiments, a geometry group is an X-object tall N×N segment of objects of the virtual environment 116, where X and N are integers. For example, each geometry group may be a 256-block tall 16×16 segment of the virtual environment 116. An example of a geometry group may be a chunk in Minecraft. However, a geometry group may take a variety of different forms and may generally comprise a group of geometry and/or objects (e.g., grouped based on proximity and/or loaded into the virtual environment 116 as a group).

In some embodiments, the lighting determiner 106 may evaluate the one or more characteristics of the locations and/or irradiance caches of a geometry group with respect to the geometry group as a whole. For example, the lighting determiner 106 may evaluate a distance between the geometry group and the camera 120, a number of frames since a prior update to the geometry group and/or since a prior sampling from locations of the geometry group, and/or a visibility of the geometry group to the camera 120. This approach may reduce computational overhead as each location and/or irradiance cache need not be evaluated individually.

In at least one embodiment, the update selector 110 may select locations and/or irradiance caches for updating based at least on a budget. The budget may define a number of rays that are cast to perform the updating. For example, the budget may act as a hard or soft constraint on the number of rays that are cast. As an example, the budget may be quantified in terms of a number of locations (e.g., vertices), a number of irradiance caches, a number of geometry groups, a number of rays, etc. As a particular and non-limiting example, a budget for an update may be 250,000 vertices. The update selector 110 may select geometry groups, locations, and/or irradiance caches until the budget is exceeded. The lighting determiner 106 may then perform the update (e.g., for the frame), and the image renderer 102 may render the frame using the updated irradiance.

In at least one embodiment, the update selector 110 may select the locations and/or irradiance caches using the update ranker 108. As described herein, the update ranker 108 may be configured to rank (e.g., using a ranking score) irradiance caches and/or locations in a virtual environment based at least on the one or more characteristics. For example, each irradiance cache, location, and/or geometry group may be assigned a ranking score. The update selector 110 may select the irradiance caches, locations, and/or geometry groups based at least on the ranking scores. For example, selections may be made from those items that have the highest ranking scores, moving down the rankings until the budget is exceeded. In addition or instead, the update ranker 108 may rank items (e.g., in an ad hoc manner) and a selection may be made based on the ranking score exceeding a threshold value. Using the update ranker 108, the update selector 110 may, for example, assign a score to each geometry group, then select geometry groups moving from highest ranking to lowest until the budget is exceeded.

The ranking of a particular item (locations, irradiance caches, geometry groups, etc.) may be based on the one or more characteristics of one or more locations and/or irradiance caches. An increase in distance of an item from the camera 120 may cause a ranking of the item to decrease. For example, the geometry group 144 is farther from the camera 120 then the geometry group 142, and therefore it may be more likely that the update ranker 108 ranks geometry group 144 lower than geometry group 142. An increase in a number of frames since an update may cause a ranking of an item to increase. For example, the geometry group 144 may have been updated four frames ago and the geometry group 142 may have been updated one frame ago, and therefore it may be more likely that the update ranker 108 ranks geometry group 144 higher than geometry group 142. In at least one embodiment, counts of samples accumulated to each irradiance cache may be stored and used to make this determination. An item that is not visible to the camera 120 may cause a ranking of the item to decrease, go to zero, and/or disqualify the item from selection by the update selector 110. For example, the geometry group 144 is not visible to the camera 120, and therefore it may be disqualified from being selected for an update, or it may be more likely that the update ranker 108 ranks geometry group 144 lower than geometry group 142 and the geometry group 140. In various embodiments, non-visible geometry is still updated, but less frequently than if it were visible. This may be desirable as non-visible geometry can still contribute to lighting of visible geometry.

In various embodiments, the visibilities and/or distances used by the update ranker 108 may be determined using, for example, primary rays and/or eye rays, which may be cast for the frame being updated. In various embodiments, distances may be queried from a hit distance buffer and visibilities may be queried from a visibility buffer. However, this is not intended to be limiting and other approaches may be used.

The update ranker 108 may be implemented using one or more algorithms and/or Machine Learning Models (MLMs). A MLM may take a variety of forms for example, and without limitation, the MLM(s) may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

As described herein, in some embodiments the image renderer 102 may use the updates to irradiance to shade one or more locations in the virtual environment 116 (e.g., the locations from which rays are cast, pixels of the screen 204, etc.). Another potential use of the irradiance cache is to help the image renderer 102 reduce noise in dynamic scenes where lighting relies heavily on temporal accumulation, while using reprojection from previous frames. The low frequency nature of stored irradiance means shaded results may be more stable than shading resulting from tracing individual rays, making the resulting image less noisy. This makes the irradiance cache a useful tool for fast rendering of noise-free images, an important requirement of real-time applications such as games.

An irradiance cache can also help to remedy artifacts that may be caused when rendering objects such as fireflies that may be spatially and/or temporally challenging to denoise using traditional techniques by providing a reasonable estimate of shaded pixel values, which can serve as a reference for a firefly removal filter. For example, the image renderer 102 may use the image denoiser 112 to denoise render data for a frame. In at least one embodiment, the image denoiser 112 may filter each pixel using a denoising filter. A denoising filter may be defined, at least partially, in world space or screen space. Each filter may comprise a filter kernel and may or may not include one or more filter directions. The filter kernel of a filter may refer to a matrix (e.g., rectangular array) that defines one or more convolutions for processing image data of an image to alter one or more characteristics of the image, such as shades and colors of the pixels of the image (e.g., through application to radiance). In some examples, a filter kernel may be applied as a separable filter in which the matrix may be represented using multiple sub-matrices, or filters, that may be applied to an image in multiple passes. When determining or computing a filter kernel for a separable filter, the disclosure contemplates that the sub-matrices may be directly computed, or may be derived from another matrix.

Each element of a matrix of a filter kernel may represent a respective pixel position. One of the pixel positions of a matrix may represent an initial pixel position that corresponds to a pixel to which the filter is applied and is typically located at the center of the matrix. A filter direction may define the alignment of the matrix relative to the image and/or pixel to which the filter is applied. Thus, when applying a filter to a pixel, other pixels for other pixel positions of a matrix of a filter kernel may be relative to the initial pixel position based on the filter direction.

Each element of a matrix of a filter kernel may comprise a filter weight for the pixel position (which may be a combination, such as a multiplication, of one or more sub-weights described herein). The matrix may be applied to an image using convolution, in which a data value for each pixel of the image that corresponds to a pixel position of the matrix may be added to data values for pixels that correspond to the local neighbors in the matrix, weighted by the filter values (also referred to as filter weights). The filter values may be configured to blur the pixels, such as by fitting a distribution(s) to a size of the filter kernel (e.g., to a width and a height), or otherwise modeling the filter weights, or values, using light-based models.

The data values to which a filter is applied may correspond to lighting condition data of the pixels such as shading values and/or irradiance values (e.g., before or after prior denoising). Thus, applying a matrix of a filter kernel to a pixel may cause the lighting condition data to be at least partially shared amongst the pixels that correspond to the pixel positions of the filter kernel. The sharing of the lighting condition data may mitigate noise due to sparsely sampling lighting conditions in ray-tracing when the filter kernel accurately defines which pixels may share lighting condition data (e.g., via the size of the matrix and filter direction(s)) and how much lighting condition data may be shared (e.g., via the filter weights). As such, where the size, filter direction(s), filtered values, and/or filter weights of the filter kernel do not accurately reflect lighting conditions of a virtual environment, the filter kernel may cause over-blurring and/or unrealistic blurring, resulting in unrealistic lighting conditions being represented in a rendered image.

In at least one embodiment, the image denoiser 112 may employ temporal accumulation for filtering pixels and may comprise one or more temporal and/or spatiotemporal filters. By leveraging temporal information of pixels, the image denoiser 112 may increase the effective sample count used to determine lighting for the pixels. When a temporally accumulated sample for a pixel gets rejected, for example, due to a disocclusion of the pixel in ray-tracing, temporal accumulation for that pixel may reset. Thus, the effective sample count for the pixel may be reduced for a number of frames as temporal data is re-accumulated. This may result in artifacts in rendered frames (e.g., fireflies), particularly when the number of rays per-pixel used to sample a virtual environment for the pixel is low.

In at least one embodiment, on disocclusions, where there are no or very few samples accumulated for an irradiance cache, the irradiance cache may be used to provide a stable and noise free estimate of the pixel value. For example, temporally accumulated results for pixels can be mixed with the entry data from one or more irradiance caches in a desired ratio (which can be based on the length of temporally accumulated history). Thus, for example, when a disocclusion for a pixel is detected, irradiance from an irradiance cache may be used for denoising the pixel and/or surrounding pixels (e.g., within a filter radius of a pixel being filtered). The first frame on disocclusion an irradiance cache value may be mixed the pixel value with a 50% ratio, this ratio may be reduced for each frame until the irradiance cache is phased out (e.g., linearly for four frames).

Noise removal filters that work in the spatial domain by applying low-pass filters may also work more efficiently when the image denoiser 112 uses one or more irradiance caches for spatial denoising. For example, for disocclusions—like those occurring near the frame borders (e.g., when rotating the camera 120)—an image denoiser may try to blur the pixels very aggressively, but because there may only be a few (sometimes just one) samples accumulated in that area, there may be a lot of noise that can get spread around the screen 204. Conventionally, the disocclusions are blurred to be less disruptive, but the result can still be far from an accurate value. However, when the (few or one) sample(s) is blurred with data from irradiance cache, this result may not be so noticeable (e.g., using a ratio as described above or otherwise), because the irradiance cache may already be close enough to the actual value. By reducing noise in disocclusions, the problem of leaking extremely noisy results from disocclusions into valid samples may be greatly reduced.

In addition to or instead of using the irradiance caches for spatial shading and/or for filtering, the irradiance caches may be used for light meters. Light meters may be based on measuring the light incoming from certain directions and may directly benefit from the irradiance caches, as the cached irradiance at a point on a surface along a measured direction may be used to calculate final exposure for the virtual environment 116.

Figure 6:
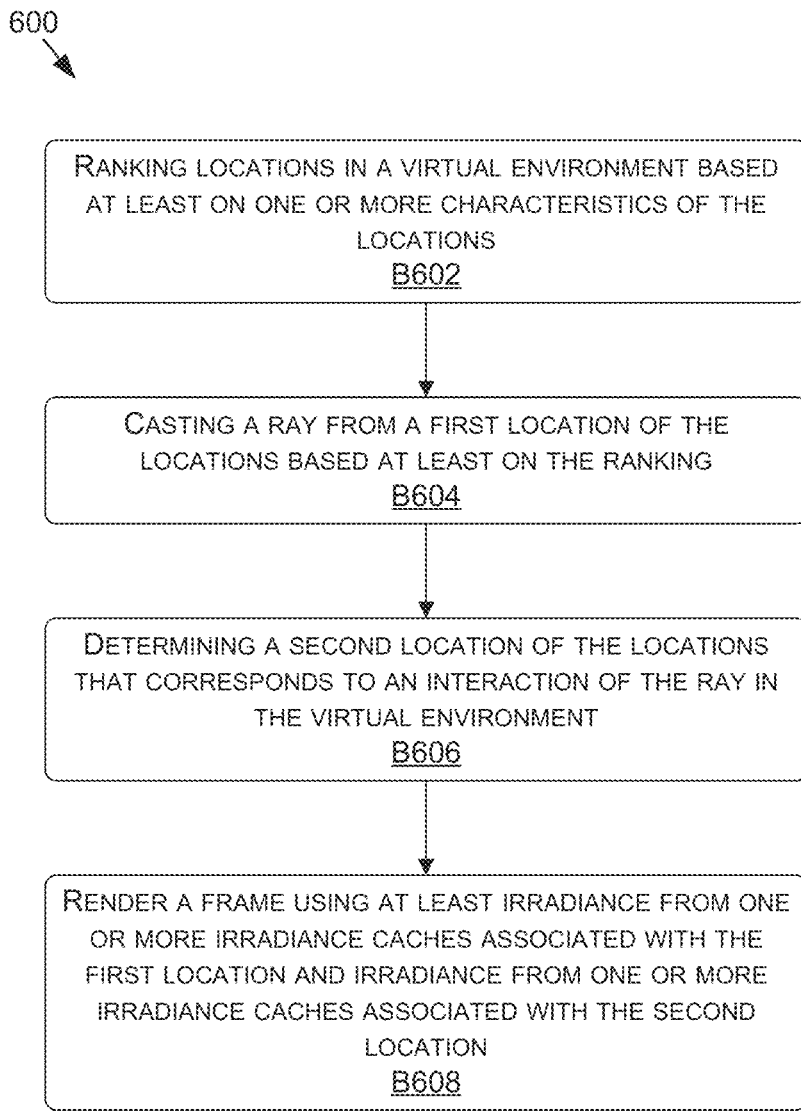
FIG. 6 is a flow diagram showing a method for ranking locations in a virtual environment to sample irradiance using irradiance caches, in accordance with some embodiments of the present disclosure.

Now referring to FIG. 6, each block of a method 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the irradiance caching system 100 (FIG. 1). However, these methods may additionally or alternatively be executed by any one system, or any combination of systems, including, but not limited to, those described herein.

FIG. 6 is a flow diagram showing the method 600 for ranking locations in a virtual environment to sample irradiance using irradiance caches, in accordance with some embodiments of the present disclosure. The method 600, at block B602, includes ranking locations in a virtual environment based at least on one or more characteristics of the locations. For example, the update ranker 108 may rank locations in the virtual environment 116 based at least on one or more characteristics of the locations (e.g., by determining for and assigning ranking scores to the irradiance caches, geometry groups, and/or locations). Each location of the locations (e.g., vertices) may be associated with one or more irradiance caches to store irradiance that corresponds to the location (e.g., in a vertex, a light map, a texel, etc.).

The method 600, at block B604, includes casting a ray from a first location of the locations based at least on the ranking. For example, the ray caster 104 may cast the ray 230 from the vertex 118F based at least on the ranking. In some embodiments, the update selector 110 may select the vertex 118F for the casting based on the ranking.

The method 600, at block B606, includes determining a second location of the locations that corresponds to an interaction of the ray in the virtual environment. For example, the ray caster 104 may determine the location 216 that corresponds to an interaction of the ray 230 in the virtual environment 116.

The method 600, at block B608, includes rendering a frame using at least irradiance from one or more irradiance caches associated with the first location and irradiance from one or more irradiance caches associated with the second location. For example, the image renderer 102 may render the frame 500 of FIG. 5 using at least the irradiance from the one or more irradiance caches associated with the vertex 118F and irradiance from one or more irradiance caches associated with the location 216 (e.g., from a light map of the face 214, the vertices 210, etc.) based at least on the interaction. In various examples, the rendering of the frame may comprise shading one or more portions (e.g., the vertex 118F) of the virtual environment 116 using the irradiance, denoising one or more pixels, and/or determining and using one or more light probes to determine exposure of the virtual environment, etc.

Figure 7:
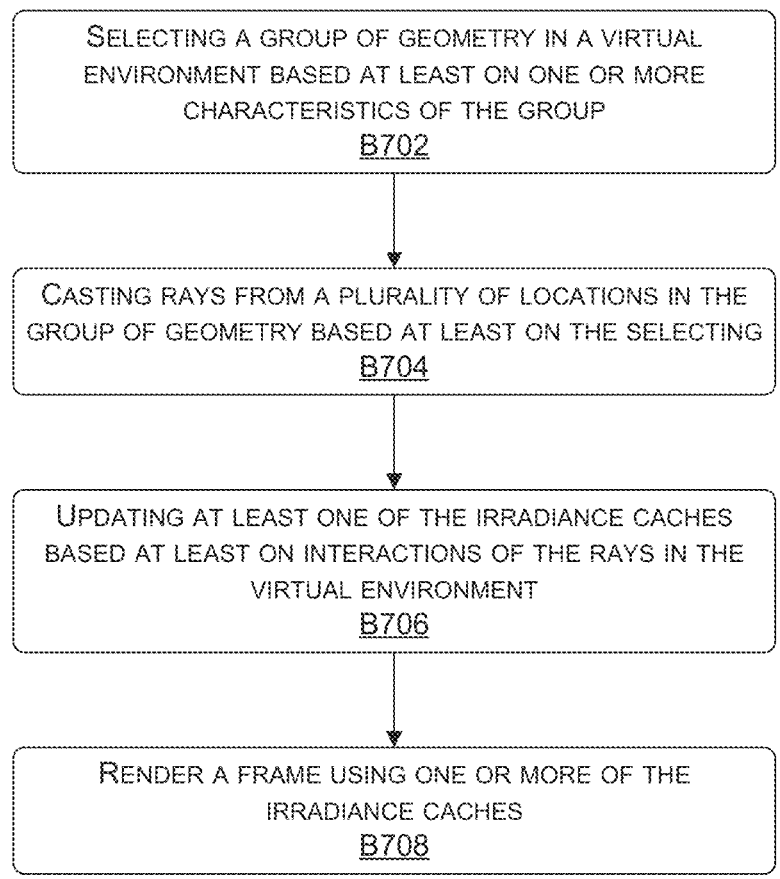
FIG. 7 is a flow diagram showing a method for selecting a group of geometry in a virtual environment to sample irradiance using irradiance caches, in accordance with some embodiments of the present disclosure.

FIG. 7 is a flow diagram showing a method 700 for selecting a group of geometry in a virtual environment to sample irradiance using irradiance caches, in accordance with some embodiments of the present disclosure. The method 700, at B702 includes selecting a group of geometry in a virtual environment based at least on one or more characteristics of the group. For example, the update selector 110 may select the geometry group 142 (e.g., from a plurality of geometry groups) based at least on one or more characteristics of the geometry group 142.

The method 700, at B704 includes casting rays from a plurality of locations in the group based at least on the selecting. For example, the ray caster 104 may cast at least one ray from each of the vertices (including the vertices 118) of each 3D object in the geometry group 142 based at least on the selecting of the geometry group 142.

The method 700, at B706 includes updating at least one of the irradiance caches based at least on interactions of the rays in the virtual environment. For example, the lighting determiner 106 may update at least some of the irradiance caches based at least on interactions of the rays in the virtual environment.

The method 700, at B708 includes rendering a frame using one or more of the irradiance caches. For example, the image renderer 102 may render a frame using irradiance from one or more of the irradiance caches. In various examples, the rendering of the frame may comprise shading one or more portions (e.g., the vertex 118F) of the virtual environment 116 using the irradiance, denoising one or more pixels, and/or determining and using one or more light probes to determine exposure of the virtual environment, etc.

Figure 8:
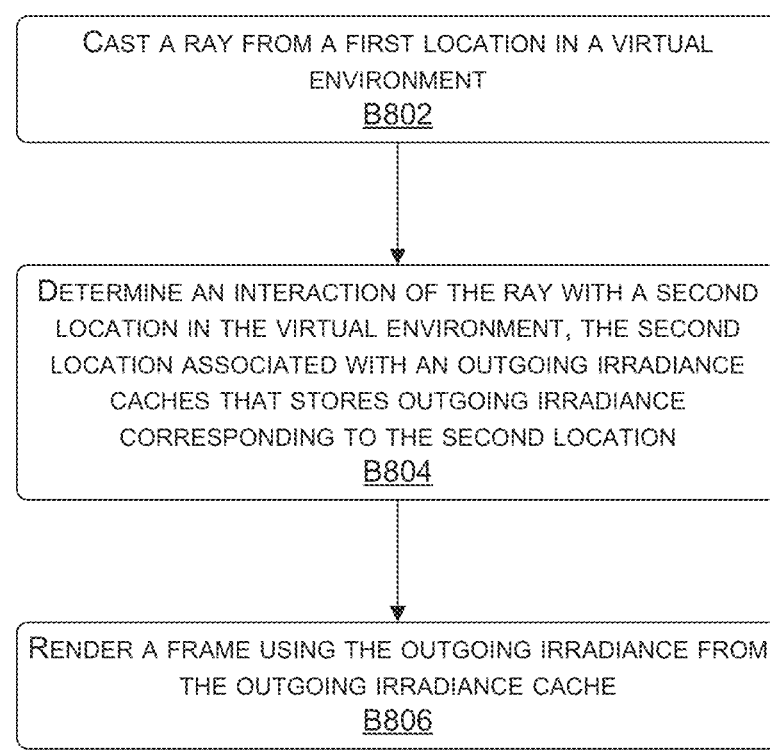
FIG. 8 is a flow diagram showing a method for rendering a frame using an outgoing irradiance cache, in accordance with some embodiments of the present disclosure.

FIG. 8 is a flow diagram showing a method 800 for rendering a frame using an outgoing irradiance cache, in accordance with some embodiments of the present disclosure. The method 800, at block B802, includes casting a ray from a first location in a virtual environment. For example, the ray caster 104 may cast the ray 232 from the vertex 118A.

The method 800, at block B804, includes determining an interaction of the ray with a second location in the virtual environment, the second location associated with an outgoing irradiance cache that stores outgoing irradiance corresponding to the second location. For example, the ray caster 104 may determine an interaction of the ray 232 with the location 234. The location 234 may be associated with an outgoing irradiance cache that stores outgoing irradiance corresponding to the second location (e.g., in the face 220 of the object 124).

The method 800, at block B806, includes rendering a frame using the outgoing irradiance from the outgoing irradiance cache. For example, the rendering a frame using the outgoing irradiance from the outgoing irradiance cache. For example, the image renderer 102 may render a frame using the outgoing irradiance and potentially incoming irradiance from one or more incoming irradiance caches. In various examples, the rendering of the frame may comprise shading one or more portions of the virtual environment 116 using the irradiance, denoising one or more pixels, and/or determining and using one or more light probes to determine exposure of the virtual environment, etc.

Example Game Streaming System

Now referring to FIG. 9, FIG. 9 is an example system diagram for a game streaming system 900, in accordance with some embodiments of the present disclosure. FIG. 9 includes game server(s) 902 (which may include similar components, features, and/or functionality to the example computing device 1000 of FIG. 10), client device(s) 904 (which may include similar components, features, and/or functionality to the example computing device 1000 of FIG. 10), and network(s) 906 (which may be similar to the network(s) described herein). In some embodiments of the present disclosure, the system 900 may be implemented.

In the system 900, for a game session, the client device(s) 904 may only receive input data in response to inputs to the input device(s), transmit the input data to the game server(s) 902, receive encoded display data from the game server(s) 902, and display the display data on the display 924. As such, the more computationally intense computing and processing is offloaded to the game server(s) 902 (e.g., rendering—in particular ray or path tracing—for graphical output of the game session is executed by the GPU(s) of the game server(s) 902). In other words, the game session is streamed to the client device(s) 904 from the game server(s) 902, thereby reducing the requirements of the client device(s) 904 for graphics processing and rendering.

For example, with respect to an instantiation of a game session, a client device 904 may be displaying a frame of the game session on the display 924 based on receiving the display data from the game server(s) 902. The client device 904 may receive an input to one of the input device(s) and generate input data in response. The client device 904 may transmit the input data to the game server(s) 902 via the communication interface 920 and over the network(s) 906 (e.g., the Internet), and the game server(s) 902 may receive the input data via the communication interface 918. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 912 may render the game session (e.g., representative of the result of the input data) and the render capture component 914 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 902. The encoder 916 may then encode the display data to generate encoded display data and the encoded display data may be transmitted to the client device 904 over the network(s) 906 via the communication interface 918. The client device 904 may receive the encoded display data via the communication interface 920 and the decoder 922 may decode the encoded display data to generate the display data. The client device 904 may then display the display data via the display 924.

Example Computing Device

Figure 10:
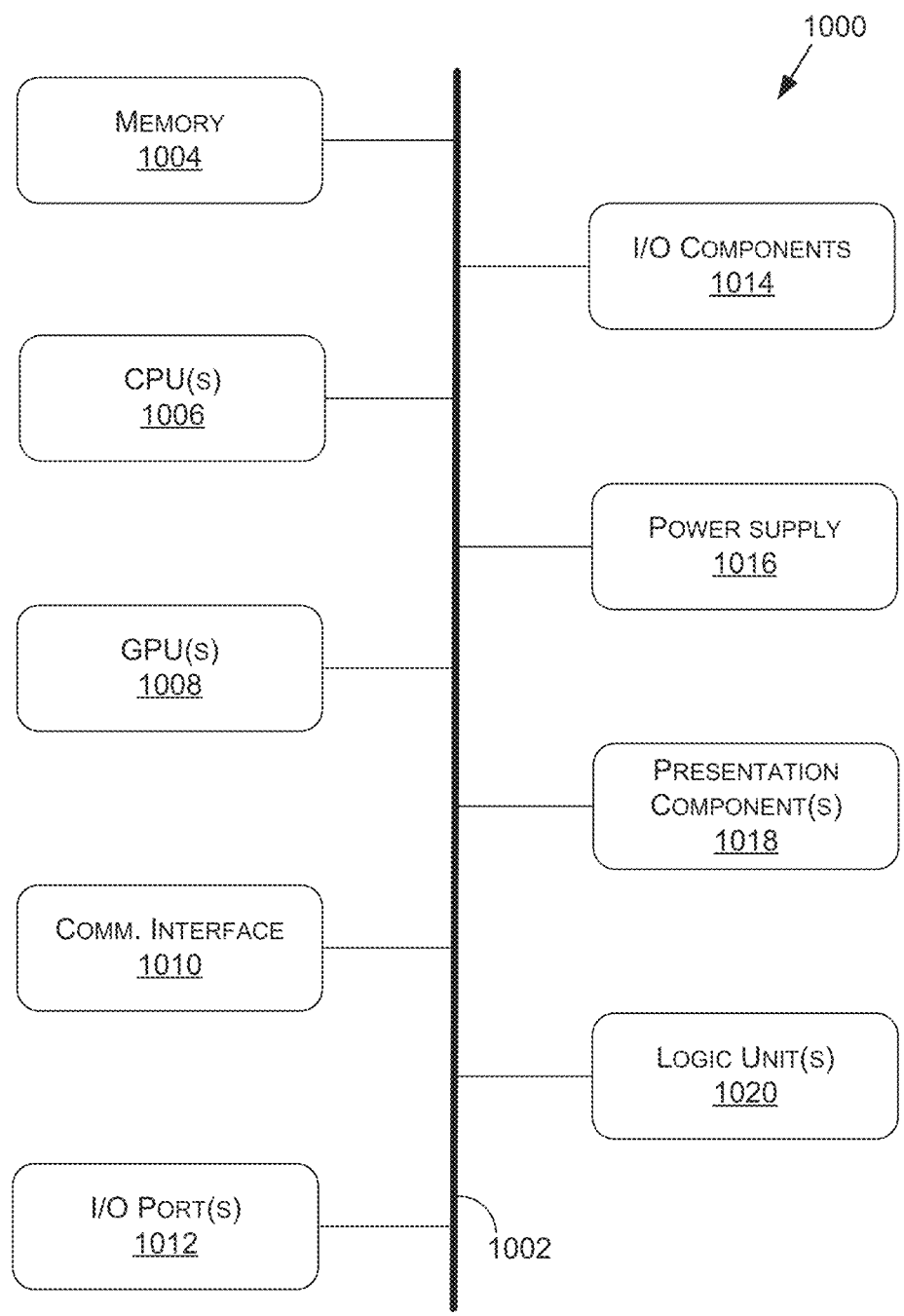
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., integrated with one or more of the CPU(s) 1006 and/or one or more of the GPU(s) 1008 may be a discrete GPU)s. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Data Center

Figure 11:
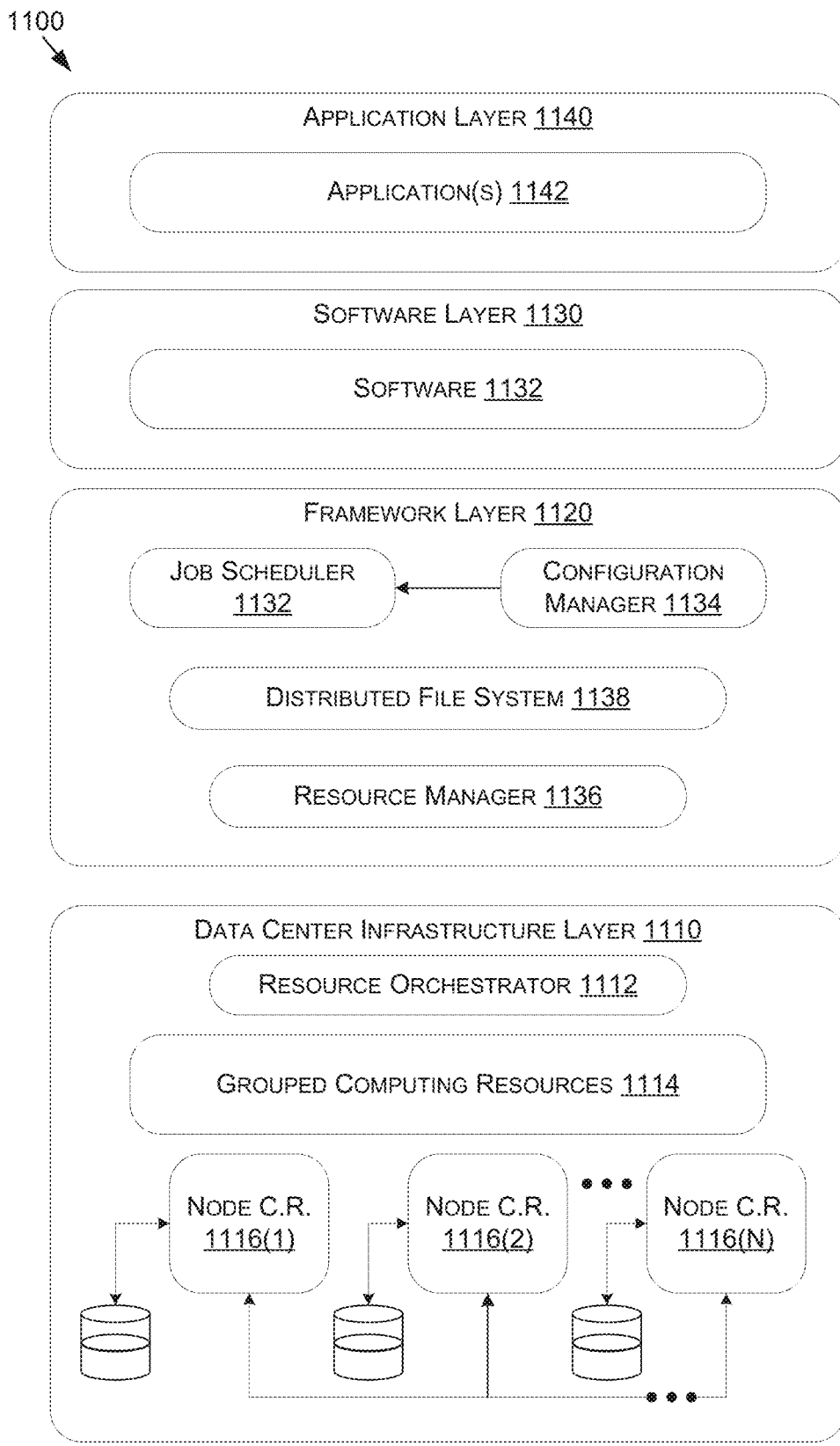
FIG. 11 is a block diagram of an example data center suitable for use in implementing some embodiments of the present disclosure.

FIG. 11 illustrates an example data center 1100, in which at least one embodiment may be used. In at least one embodiment, data center 1100 includes a data center infrastructure layer 1110, a framework layer 1120, a software layer 1130 and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1122 may configure or otherwise control one or more node C.R.s 1116(1)-1116(N) and/or grouped computing resources 1114. In at least one embodiment, resource orchestrator 1122 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1132, a configuration manager 1134, a resource manager 1136 and a distributed file system 1138. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1132 may include a Spark driver to facilitate scheduling of workloads supported by various layers of data center 1100. In at least one embodiment, configuration manager 1134 may be capable of configuring different layers such as software layer 1130 and framework layer 1120 including Spark and distributed file system 1138 for supporting large-scale data processing. In at least one embodiment, resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. In at least one embodiment, resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A method comprising:
ranking at least one first location of a plurality of locations in a virtual environment against at least one second location of the plurality of locations based at least on one or more characteristics of the at least one first location and the at least one second location, each location of at least the first and second locations being associated with one or more irradiance caches to store irradiance that corresponds to the location;
casting a ray from the at least one first location based at least on the at least one first location having a higher ranking than the at least one second location;
determining at least one irradiance value that corresponds to an interaction of the ray in the virtual environment; and
rendering, based at least on the interaction, a frame of the virtual environment using at least the irradiance from the one or more irradiance caches associated with the first location and the at least one irradiance value.

2. The method of claim 1, wherein the irradiance stored at the one more irradiance caches is the irradiance at the location.

3. The method of claim 1, further comprising selecting the at least one first location from the locations for the casting based at least on the ranking and a budget that defines a number of rays that are cast from the locations to perform the rendering.

4. The method of claim 1, wherein each location of the locations is a vertex of a polygon mesh corresponding to a three-dimensional object.

5. The method of claim 1, wherein the rendering of the frame comprises shading one or more portions of the virtual environment using the irradiance from the one or more irradiance caches associated with the at least one first location and the irradiance from the one or more irradiance caches associated with the at least one second location.

6. The method of claim 1, wherein the ranking comprises ranking geometry groups that include subsets of the locations based at least on one or more characteristics of the geometry groups.

7. The method of claim 1, wherein the one or more characteristics are based at least on a distance between the location and a virtual camera in the virtual environment.

8. The method of claim 1, wherein the one or more characteristics are based at least on a visibility of the location with respect to a virtual camera in the virtual environment.

9. The method of claim 1, wherein the one or more characteristics are based at least on a number of frames since a prior update to the one or more irradiance caches associated with the location.

10. A method comprising:
selecting at least one group of geometries in a virtual environment based at least on one or more first locations within the at least one group being ranked higher than one or more second locations in the virtual environment in a ranking based at least on one or more characteristics of the one or more first locations and the one or more second locations, the at least one group comprising irradiance caches to store irradiance of the one or more first locations within the group;

casting one or more rays from the one or more first locations based at least on the selecting of the at least one group;

updating at least one of the irradiance caches based at least on one or more interactions of the one or more rays in the virtual environment; and rendering a frame of the virtual environment using one or more of the irradiance caches.

11. The method of claim 10, wherein the selecting includes selecting a subset of groups of geometries of the virtual environment using the ranking and a budget that defines a number of rays that are cast from the groups of geometries to perform the rendering.

12. The method of claim 10, wherein the one or more characteristics are based at least on a distance of at least a portion of the at least one group from a virtual camera in the virtual environment.

13. The method of claim 10, wherein the one or more characteristics are based at least on a visibility of at least a portion of the at least one group with respect to a virtual camera in the virtual environment.

14. The method of claim 10, wherein the one or more characteristics are based at least on a number of frames since a prior update to one or more of the irradiance caches of the at least one group.

15. The method of claim 10, wherein the rendering comprises applying a denoising filter to a pixel using one or more irradiance values from the one or more of the irradiance caches to determine a value of a pixel based at least on detecting a disocclusion of the pixel.

16. A method comprising:

casting a ray from a first location in a virtual environment;

determining an interaction of the ray with a second location in the virtual environment, the second location associated with an outgoing irradiance cache that stores outgoing irradiance corresponding to the second location; and rendering a frame of the virtual environment using the outgoing irradiance from the outgoing irradiance cache based at least on a distance between the first location and the second location.

17. The method of claim 16, wherein the rendering of the frame includes shading the first location using the outgoing irradiance from the outgoing irradiance cache.

18. The method of claim 16, wherein the rendering uses the outgoing irradiance based at least on the distance being greater than a threshold value.

19. The method of claim 16, wherein the rendering includes applying a denoising filter to a pixel using the outgoing irradiance based at least on detecting a disocclusion of the pixel.

20. The method of claim 16, wherein the method further comprises updating an outgoing irradiance cache that stores outgoing irradiance corresponding to the first location using the outgoing irradiance corresponding to the second location.

* * * * *